United States Patent [19]

Swofford

[11] Patent Number: 4,898,786
[45] Date of Patent: Feb. 6, 1990

[54] POLYESTER FILM PRIMED WITH AN AMINOFUNCTIONAL SILANE, AND FILM LAMINATES THEREOF

[75] Inventor: Howard W. Swofford, Taylors, S.C.

[73] Assignee: Hoechst Celanese Coproration, Somerville, N.J.

[21] Appl. No.: 207,069

[22] Filed: Jun. 15, 1988

[51] Int. Cl.$^4$ .................. B32B 27/06; B32B 27/36; B32B 9/04; B32B 13/12
[52] U.S. Cl. .................................. 428/480; 428/447; 428/448; 428/451
[58] Field of Search ............... 428/480, 447, 448, 451

[56] References Cited

U.S. PATENT DOCUMENTS

| | | | |
|---|---|---|---|
| 4,251,591 | 2/1981 | Chi | 428/480 |
| 4,690,959 | 9/1987 | Plueddemann | 524/536 |
| 4,800,125 | 1/1989 | Plueddemann | 428/405 |

OTHER PUBLICATIONS

Day, 1973-1974, Modern Plastics Encyclopedia, Polyester Film, p. 162.

Primary Examiner—George F. Lesmes
Assistant Examiner—D. R. Zirker
Attorney, Agent, or Firm—Perman & Green

[57] ABSTRACT

Oriented polyester films primer coated with a hydrolyzed amino silane are disclosed. These silanes in the unhydrolyzed state have the formula:

$$XSi(R^2)_a(R^3)_b$$

wherein X is a radical selected from the group consisting of $H_2NR^1HNR^1-$ and $H_2NR^1HNR^1HNR^1-$; the $R^1$'s are the same or different groups selected from the group consisting of $C_1$ and $C_8$ alkyl or phenyl; $R^2$ is a hydrolyzable group selected from the group consisting of $C_1$ to $C_8$ alkoxy, an acetoxy group or a halide; $R^3$ is a nonreactive, nonhydrolyzable group selected from the group consisting of $C_1$ to $C_3$ alkyl or phenyl; (a) is an integer ranging from 1 to 3; (b) is an integer ranging from 0 to 2, with the sum of (a) and (b) being 3.

The hydrolyzed aminosilane is applied to the film as an aqueous solution at any suitable stage during manufacture of the film, i.e., before or during the stretching operation, or it may also be applied to the finished film. The resultant primed polyester film is found to exhibit excellent adhesion to other polymeric materials and can be readily laminated to other polymeric films. Adhesive qualities are maintained even at subfreezing temperatures.

14 Claims, No Drawings

POLYESTER FILM PRIMED WITH AN AMINOFUNCTIONAL SILANE, AND FILM LAMINATES THEREOF

The present invention relates to oriented polyester film coated on one or both sides with a primer coating composition comprising a hydrolyzed aminofunctional silane which renders the film more receptive to lamination with other polymeric film materials such as polyvinylbutyral, polyolefins and other polymers.

BACKGROUND OF THE INVENTION

The present application is related to applicants copending U.S. Pat. applications Ser. No. 123,847, filed Nov. 23, 1987, and application Ser. No. 148,818, filed Jan. 27, 1988.

Oriented polyester film, particularly biaxially oriented film composed of polyethylene terephthalate (PET), has been widely used as a packaging material or as a base for microfilm, reprographic films, proofing films and the like. It has good optical clarity and toughness which renders it extremely suitable for such applications.

Polyester films have recently found expanded applications as transparent and translucent layers applied to solid substrates and particularly to transparent substrates. Thus, such films may be applied to windows and viewing or lighting media to control the transparency thereof. Another more recent application for polyester film involves its use as an antilacerative layer in the construction of automotive glazing products such as windshields, rear windows, sun roof panels and the like, and in architectural safety glass. One of the simpler automotive glazing products may comprise a flexible interlayer of polyvinylbutyral sandwiched between glass on one side and a high modulus film, for example polyester film, on the opposite side.

Polyvinybutyral layers are used in sandwich automotive glass construction to prevent breaking of the glass in the case of impact (so called safety glass), whereas the role of the polyester film positioned on the interior glass surfaces is to prevent skin lacerations caused by hard impact of the head or body with automotive glass causing the glass to shatter, as a consequence of an automobile accident. Constructions of this type and techniques for applying the polyester film to automotive glass surfaces are disclosed in U.S. copending application Ser. No. 148,818, filed Jan. 27, 1988 the disclosure of which is incorporated herein by reference.

The above referenced copending application teaches the use of a layer of plasticized polyvinylbutyral (PVB) as an adhesive layer to facilitate adhesion of the polyester film to the glass. While PVB adheres very well to glass, the adhesion between it and polyester film is not as great, particularly at subfreezing temperatures. Corona discharge treatment and flame treatment have been used to give adhesion between PVB sheet and polyester film as disclosed in U.S. Pat. No. 3,900,673. Coatings of gelatin and PVDC and acrylic latex coatings have also given adhesion between polyester film and PVB. However, none of these methods of imparting adhesion give adhesion at the subfreezing temperatures to which windows in automobiles and buildings are commonly subjected. It is believed that any improvement of the adhesion of the polyester film to the PVB improves the function of the polyester film as an antilacerative shield.

Numerous primer coatings are known in the prior art for the application to the surface of polyester film to improve the adhesion of the film to various materials. Examples of such coatings include compositions based on vinylidene chloride polymers (U.S. Pat. No. 2,698,240), thermosetting acrylic or methacrylic polymers (U.S. Pat. No. 3,819,773) and like materials. Certain water dispersible copolyesters have also been disclosed as adhesives for laminating sheets of polyester film to one another or to sheets of nylon film, as taught in U.S. Pat. Nos. 3,563,942 and 3,779,993. Solvent based polyurethane adhesives have also been used to promote adhesion, but with attendant problems of solvent emissions and safety.

The use of silane coupling agents to improve the bonding properties of polyethylene sheets and polyester sheets is known. For example, polyester sheets and polyethylene sheets primed with either vinyl trimethoxy silane or chloropropyltrimethoxy silane have been successfully laminated using a hot melt adhesive such as an ethylene/vinylacetate terpolymer or an elastomeric polyester as disclosed by E. Plueddemann, "Bonding Through Coupling Agents", Plenum Press, N.Y., 1985. In addition, the use of N-2-aminoethyl-3-aminopropyltrimethoxy silane (sold under the trademark Z-6020 by Dow Corning) as a primer coating to enhance the adhesion of an ionomer resin (salt of a copolymer of ethylene and methacrylic acid) to glass and to polycarbonate sheets is disclosed in U.S. Pat. No. 4,663,228. Related silanes such as N-3-aminopropyltrialkoxy silanes are known to enhance the adhesion between polyurethane films and glass substrates, as disclosed in published European Patent application No. 171,917.

None of these prior art disclosures, however, addresses the problem of the maintenance of good adhesion between polyester film and polyvinylbutyral or other polymer films at subfreezing temperatures where many primer materials fail.

Accordingly, it is an object of this invention to provide an oriented, self supporting film material having enhanced adhesion when laminated with other polymer films.

A further object is to provide a primer coating for polyester film which enhances adhesion between polyester and polyvinylbutyral films and imparts resistance to delamination even at subfreezing temperatures.

SUMMARY OF THE INVENTION

These and other objects of the invention may now be achieved by the provision of an oriented polyester film which has been primer-coated with a hydrolyzed aminofunctional silane.

The aminofunctional silanes useful as a primer layer for the purposes of this invention are diamino or triamino silanes responding in their unhydrolyzed state to the general formula:

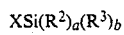

wherein X is a radical selected from the group consisting of $H_2NR^1HNR^1$— and $H_2NR^1HNR^1HNR^1$—; the $R^1$'s are the same or different groups selected from the group consisting of $C_1$ to $C_8$ alkyl or phenyl; $R^2$ is a hydrolyzeable group selected from the group consisting of $C_1$ to $C_8$ alkoxy, an acetoxy group or a halide; $R^3$ is a nonreactive, nonhydrolyzeable group selected from the group consisting of $C_1$ to $C_3$ alkyl or phenyl; (a) is an integer ranging from 1 to 3; (b) is an integer ranging from 0 to 2, with the sum of (a) and (b) being 3.

Examples of suitable silanes include N-(2-aminoethyl)-3-aminopropylmethyl-dimethoxysilane, N-(2-aminoethyl-3-aminopropyl) trimethoxysilane, N-2-aminoethyl-3-aminopropyltris (2-ethylhexoxy) silane, 6-(aminohexylaminopropyl) trimethoxysilane, (aminoethylaminomethyl) phenethyltrimethoxysilane and N-2-aminoethyl-2-aminoethyl-3-aminopropyltrimethoxysilane.

The more preferred silanes for the purposes of this invention are diamino primary amines having the following formula:

$$H_2NR^1NHR^1Si(R^2)_a(R^3)_b$$

wherein the $R^1$'s are the same or different alkyl radicals having from 1 to 3 carbon atoms, $R^2$ is a $C_1$ to $C_3$ alkoxy group, (a) is 3 and (b) is 0.

The most preferred are silanes of the above formula wherein $R^1$ and $R^2$ are $C_1$ to $C_3$ alkyl radicals, $R^3$ is a $C_1$ to $C_3$ alkoxy group, (a) is 3 and (b) is 0. The most preferred silane is N-2(aminoethyl-3-aminopropyl) trimethoxy silane having the formula:

$$H_2N(CH_2)_2NH(CH_2)_3Si(OCH_3)_3$$

The hydrolyzed aminosilane is applied to the film as an aqueous solution at any suitable stage during manufacture of the film, i.e., before or during the stretching operation, or it may also be applied to the finished film. The resultant primed polyester film is found to exhibit excellent adhesion to other polymeric materials and can be readily laminated to other polymeric films. Adhesive qualities are maintained even at subfreezing temperatures.

DETAILED DESCRIPTION OF THE INVENTION

The primer formulation of this invention is prepared by mixing the aminosilane with water at a level within the range of about 0.2 to about 6% by weight. Optionally, a weak acid such as acetic acid may be added to facilitate hydrolysis. At least one of the hydrolyzeable groups of the silane is hydrolyzed into a silanol group (SiOH). It is believed that the hydrolysis product of the aminosilane has a partially hydrolyzed, cyclized structure, with the amino group probably forming ionic bonds to the silcon portion of the molecule. Thus, the term hydrolyzed as used herein also may refer to such partially hydrolyzed structures.

Although the preferred exemplified film which may be primer coated in accordance with the present invention is polyester film, the invention is equally applicable to other high modulus films including polyamide film and polycarbonate film. The base film used normally has a higher modulus or stiffness than the polymer or sheet to be laminated to it, and a higher melting or softening point.

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus.

For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching, to impart strength and toughness to the film, can range from about 3.0 to about 5.0 times.

The hydrolyzed aminosilane primer coating of this invention in the form of an aqueous solution may be applied in-line at one of three stages during the film manufacture; the pre-draw stage at the point between the casting of the amorphous sheet and the first stretch such as disclosed, for example, in British Patent No. 1,411,564, the inter-draw stage subsequent to the uniaxial drawing but prior to biaxial drawing such as disclosed, for example, in the U.S. Pat. No. 4,214,035; or the post draw stage subsequent to biaxial stretching, but prior to winding the film. Normally, the heat applied to the film during the stretching or final conditioning stages is sufficient to evaporate off the water and other volatiles and dry the primer coating, although a separate drying step would be required if the coating were applied subsequent to such heating steps. The coating may also be applied off-line to finished film such as by first subjecting the film surface to a corona discharge treatment prior to the coating operation. The film surface is then dried to remove the water.

In one preferred embodiment, the primer coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, slot coating or immersion coating. In a preferred embodiment, the polyester film is coated by means of a gravure cylinder. Also, the uniaxially drawn film is preferably subjected to a corona discharge by a corona discharge apparatus prior to coating as is known in the art. The discharge treatment decreases the hydrophobic character of the polyester film surface, which permits the water based coating to more easily wet the surface and thus improve the adhesion of the coating to the surface.

The hydrolyzed amino silane of the present invention is applied to the base film as an aqueous solution at a concentration of from about 0.2 to about 6% by weight of the hydrolyzed aminosilane. A weak acid such as acetic, phosphoric or the like is then added at a level of from about 0.1 to about 0.5% by weight to facilitate hydrolysis. The preferred level of addition of the acid is about 0.2% by weight. The preferred concentration of the hydrolyzed aminosilane is within the range of about 0.5 to about 2.5% by weight. The preferred concentration is such to yield a final dry primer coating weight of from about $0.10 \times 10^{-6}$ to about $20 \times 10^{-6}$ lbs. per square foot of film. Preferably the range is from about 0.20×10⁻⁶ to about 1.5×10⁻⁶ lbs. per square foot, with about 0.80×10⁻⁶ lbs. per square foot being the target weight for coatings applied in-line. Where the coating is applied off-line to finished film, the target dry coating weight is about 10×10⁻⁶ lbs. per square foot.

The coating of this invention may be applied to one or both sides of the film, or it may be applied to one side and a different coating such as a thermosetting acrylic or methacrylic polymer applied to the opposite side, such as taught in U.S. Pat. No. 4,214,035. The coating may also in some cases be applied over a different primer coating to which it will adhere and which is already present on the surface of the film, such as a thermosetting acrylic coating as described in U.S. Pat. No. 3,819,773.

An especially significant application in the glass field is the utilization of polyester film coated on one side with the primer coating of this invention and on the opposite side with an abrasion resistant coating such as a radiation curable hydrolyzed vinyl-functional silane composition also containing a multifunctional crosslinking agent and an optional photoinitiator, such as disclosed in U.S. patent application Ser. No. 123,847, filed Nov. 23, 1987, the disclosure of which application is incorporated herein by reference. Such materials have shown to improve the abrasion resistance of the surfaces of a variety of plastic films, including polyester film making the films more useful in applications where the surface is likely to be subjected to abrasion. Examples of suitable vinyl-functional silanes disclosed in the referenced application include vinyl alkoxy silanes such as vinyltriethoxysilane, vinyltrimethoxysilane and vinyltris (2-methoxyethoxy) silane. Preferred crosslinkers are multi functional acrylate or methacrylate monomers such as ethoxylated trimethylolpropane triacrylate.

Other suitable abrasion resistant coatings may also be used such as are disclosed for example in U.S. Pat. Nos. 4,177,315, 4,239,798, 4,310,600 and 4,348,462.

The coating composition may also contain other ingredients so long as such ingredients do not detract from the adhesion promoting action of the hydrolyzed aminosilane. Such would include minor amounts of colloidal silica, dyes, pH regulating agents, wetting agents and the like. The primer coating is present on the film surface as a continuous coating, which term is also intended to include cases where the primer may form a plurality of islands or segregated regions of coating.

Scrap film made during production that is coated with the primer coatings of the invention can be ground and mixed with fresh polyester, re-melted and re-extruded to produce oriented film. Such film produced containing significant quantities of primed scrap reclaim, exhibits very little degradation of physical properties due to the presence of the coating impurity and color generation is also low. Thus, the primed film of this invention offers commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above.

As indicated above, the primer coated film of this invention forms excellent adhesive bonds with other plastic films to which it is laminated. Examples of such films include polyvinylbutyral, polycarbonate, polyurethane, polyolefins such as polyethylene or polypropylene, polystyrene, and similar films. Laminates may be made by forming a sandwich of the films and heating the structure to a temperature below the melting point of the polyester film but above the melting point of the other film, preferably while simultaneously applying moderate pressure to the sandwich structures. Preferred heating temperatures generally range from about 125° C. to 225° C. The other plastic films used to form the laminates may themselves be primer coated if desired.

An especially significant application in the glass field is the utilization of polyester film coated on one side with the primer coating of this invention. The primed side of the polyester film is laminated to a sheet of polyvinylbutyral that is also laminated to a sheet of glass. For this application the preferred aminosilane is N-2-(aminoethyl)-3-aminopropyl trimethoxysilane (AE- APTMS). Polyester film primed with AE-APTMS has high adhesion to polyvinylbutyral at normal temperatures and also has good adhesion to polyvinylbutyral at subfreezing temperatures where adhesion fails with other primers and treatments.

The polyester film of this invention can be sandwiched between two layers of PVB and two layers of glass with at least one side of the film primed with aminosilane and the other side either being primed with aminosilane or having a metal or metal oxide coating for solar control and IR reflection. In another configuration the polyester film is laminated to the interior or inboard surface of the glass as an anti-lacerative layer with a layer of PVB between the film and the glass; the side of the film primed with aminosilane is laminated to the glass and the other side of the film is protected by an abrasion resistant coating.

The thickness of polyester film suitable for use in this invention may generally range from about 0.25 to about 10 mils or more. In multilayer automotive windshield applications the preferred thickness is on the order of 3 to 4 mils.

The following examples are illustrative of the invention.

EXAMPLE I

N-2-(aminoethyl)-3-aminopropyltrimethoxysilane (AE-APTMS) was dispersed in ordinary tap water to form a concentration of 1.0% by weight AE-APTMS. Acetic acid was then added at a concentration of 0.2% by weight to facilitate hydrolysis.

Polyethylene terephthalate polymer was melted and extruded through a slot die onto a casting drum maintained at a temperature of about 20° C. The melt froze to form a cast sheet. The cast sheet was longitudinally stretched at a draw ratio of approximately 3.5 to 1 while maintained at a temperature of about 80° C. The longitudinally drawn film was corona treated by a corona discharge apparatus and thereafter coated by reverse gravure with the solution of hydrolyzed amino silane prepared above. The corona treated, longitudinally drawn, coated film was dried at a temperature of about 100° C. Thereafter, the film was stretched in the transverse direction at a draw ratio of 3.9 to 1 to produce a biaxially drawn film. The biaxially drawn film was then heat set at a maximum temperature of 230° C. The dry weight of the coating was about 0.50×10⁻⁶ lbs. per square foot of film. The thickness of the base film was about 3 mils.

EXAMPLES 2-4

Primer coated films were prepared exactly as set forth in Example 1 above except that the concentration of AE-APTMS in the coating solution was 1.5% by weight in Example 2, 2.0% by weight in Example 3 and 2.5% by weight in Example 4.

EXAMPLES 5–8

In order to perform comparative tests, solutions of N-3-aminopropyltrimethoxy silane (APTMS) having the formula $H_2N(CH_2)_3Si(OCH_3)_3$ were prepared by the same method as in Example 1. Primer coated films were prepared exactly as set forth in Example 1, The concentration of APTMS in the coating solution was 1.0% by weight in Example 5, 1.5% by weight in Example 6, 2.0% by weight in Example 7 and 2.5% by weight in Example 8.

EXAMPLES 9–10

Primer coated films were prepared by the same method as set forth in Example 1. For Example 9, the primer coating was an acrylic latex applied from an aqueous dispersion at a concentration of 4% by weight. (The acrylic coating is a copolymeric latex as described in U.S. Pat. No. 4,571,363.) For Example 10, the primer coating was an aqueous dispersion of a water dispersible copolyester applied at a concentration of 4% by weight. (The water dispersible copolyester coating is described in U.S. Pat. No. 4,493,872.)

Adhesion of each of the films prepared above to polyvinylbutyral was evaluated by laminating the film to a polyvinylbutyral sheet and then testing the peel strength of a 1 inch wide strip by doing a 180° peel test in an Instron tester. A 6×8 inch sheet of the coated film was laminated to "Saflex TG" (sold by Monsanto Chemical Company), a PVB sheet used in automotive safety glass, and to glass by placing the side coated with aminosilane in contact with the PVB and placing the PVB in contact with the glass. A one inch wide strip of plain PET film (0.5 mil thick) was placed between the coated film and the PVB in order to provide a nonadhered leader for doing the peel test. A sheet of "Kapton" (a Dupont trademark) was placed on top of the polyester to serve as a release liner and another piece of glass was placed on top of the Kapton. This construction was sandwiched between two pieces of cardboard, which serves to distribute pressure evenly, and the assembly was placed in a hydraulic press that had been preheated to 150° C. The platens of the press were closed sufficiently for contact to be made top and bottom between the platens and the cardboard and the construction was allowed to preheat for five minutes. Pressure was then increased to 150 psi, and maintained for 30 minutes. With the pressure maintained at 150 psi, the platens were cooled to room temperature with circulating water. Once the platens had cooled to room temperature the laminate was removed. One inch wide strips were cut in the PET film using a scalpel.

To test the peel strength, the laminated sample, PET/PVB/glass, was placed in an Instron tester with the glass/PVB clamped in the lower jaws of the Instron and the nonadhered leader hanging free and pointing down toward the jaws. A length of #610 "Scotch" tape (a 3M trademark) was doubled over and attached to the nonadhered leader. The length of Scotch tape was then clamped in the upper jaws of the Instron. The angle between the leader and PVB/glass was 180°. The peel was done at a rate of 1 inch/min. for a length of one inch. The peak force needed to peel the PET from the PVB was read from the strip chart. Three laminated samples were made for each example. For each 6×8 laminated sample three pulls were done at room temperature (23° C.) and three pulls were done at −10° C. Results are shown in Table 1.

TABLE 1

| Film | 180° Peel Strength (lb./in.) | |
|---|---|---|
| | 23° C. | −10° C. |
| Example 1 | 15.1 * | 8.1 |
| Example 2 | 12.8 | 11.8 |
| Example 3 | 8.7 * | 10.8 |
| Example 4 | 16.6 | 10.0 |
| Example 5 | 8.3 | 0.0 |
| Example 6 | 5.3 | 0.0 |
| Example 7 | 7.5 | 0.0 |
| Example 8 | 10.0 | 0.0 |
| Example 9 | 3.8 | 0.0 |
| Example 10 | 0.0 | 0.0 |

*PVB delaminated from the glass

As can be seen from the Table, film samples primed using the AE-APTMS amino silane of this invention exhibit a marked improvement in peel resistance in both the room temperature test and also when tested after conditioning at −10° C. for 24 hours when compared with samples primed with a standard water dispersible copolyester or an acrylic latex. Film samples primed with APTMS showed adhesion at room temperature, but essentially no adhesion after the 24 hour conditioning at −10° C.

EXAMPLE 11

N-2-(aminoethyl)-3-aminopropyltrimethoxysilane was coated off-line (meaning on a coating line separate from the film production line) onto finished, crystallized, biaxially oriented PET film and nip laminated to PVB. The coating was 1.5% Z-6020 (sold by Dow Corning) with 0.2% acetic acid added to promote hydrolysis. The film, running at 100 fpm, was corona treated and then coated using reverse gravure. The coating weight was $14 \times 10^{-6}$ lbs./ft.$^2$. The coated film was then nip laminated to 30 mil sheet of polyvinylbutyral using a nip roll at 220° F. and 400 lb./linear inch pressure. The PET/PVB laminate was laminated to glass and tested as described for Examples 1-10. At 23° C. the peel adhesion was 12.5 lbs.in. At 10° C. the peel adhesion was 1.4 lbs./in.

EXAMPLE 12

A polyester film coated on one side with AE-APTMS for adhesion to polyvinylbutyral may be coated on the opposite side with a suitable anti-abrasion coating as follows: 48.0 grams of vinyltrimethoxysilane are added dropwise at room temperature to 72 grams of Nalco 1034A, a commercially available acidic colloidal silica, with gentle stirring using a magnetic stirrer. The mixture was stirred for 4 hours at room temperature in a closed container and was then heated to 60° C. in a water bath for 30 minutes while still being stirred.

4.8 grams of SARTOMER C-9035, a water-soluble, highly ethoxylated trimethylolpropane triacrylate commercially available from ARCO Specialty Chemicals, was mixed with 4.0 grams of isopropanol, 0.9 grams of IRGACURE 500, a photoinitiator commercially available from Ciba-Geigy, and 0.2 grams of a fluorinated surfactant commercially available from 3M under the trademark Fluoral. The resulting mixture was added to 12 grams of the silica/vinyltrimethoxysilane condensate to form the radiation curable coating composition.

The coating composition is applied, using a #18 Meyer rod, to a 4 mil thick, acrylic-primed side of polyester film, which was primed on the other side with AE-APTMS aminosilane in accordance with Example 1 of this invention. The coating is first dried in an oven maintained at 75° C. for one minute and then crosslinked by UV irradiation by passing the coated polyester film four times through a RPC Equipment Co. Model QC 1202 processor at 25 feet/minute using two 200 watt-/inch lamps. The above coating was found to significantly improve the abrasion resistance of the coated side of the film surface rendering the film more useful in automotive windshield applications.

What is claimed is:

1. An oriented self-supporting high modulus polyester film having a continuous primer coating composition on one or both sides thereof, said coating composition comprising the dried residue of a hydrolyzed aminosilane compound having the formula in the unhydrolyzed state:

$$XSi(R^2)_a(R^3)_b$$

wherein X is a radical selected from the group consisting of $H_2NR^1HNR^1-$ and $H_2NR^1HNR^1HNR^1-$; the $R^1$'s are the same of different groups selected from the group consisting of $C_1$ to $C_8$ alkyl or phenyl; $R^2$ is a hydrolyzeable group selected from the group consisting of $C_1$ to $C_8$ alkoxy, an acetoxy group or a halide; $R^3$ is a nonreactive, nonhydrolyzeable group selected from the group consisting of $C_1$ to $C_3$ alkyl or phenyl; (a) is an integer ranging from 1 to 3; (b) is an integer ranging from 0 to 2, with the sum of (a) and (b) being 3, said primer coating composition being present at a weight effective to improve the adhesion of other polymers to said film.

2. The film of claim 1 wherein said aminosilane compound is selected from the group consisting of:
N-(2-aminoethyl)-3-aminopropylmethyl dimethoxysilane, N-(2-aminoethyl-3-aminopropyl) trimethoxysilane, N-2-aminoethyl-3-aminopropyltris (2-ethylhexoxy) silane, 6-(aminohexylaminopropyl) trimethoxysilane, (aminoethylaminomethyl) phenethyltrimethoxysilane and N-2-aminoethyl-2-aminoethyl-3-aminopropyltrimethoxysilane.

3. The film of claim 1 wherein said film is biaxially oriented polyethylene terephthalate film.

4. The film of claim 3 wherein said amino silane compound has the following formula in the unhydrolyzed state:

$$H_2NR^1NHR^1Si(R^2)_a(R^3)_b$$

wherein the $R^1$'s are the same or different alkyl radicals having from 1 to 3 carbon atoms, $R^2$ is a $C_1$ to $C_3$ alkoxy group, (a) is 3 and (b) is 0.

5. The film of claim 4 wherein said amino silane compound is N-2-(aminoethyl)-3-amino propyltrimethoxysilane.

6. The film of claim 3 wherein said film is prepared by melt extruding a substantially amorphous polyester film and thereafter orienting the film by stretching it sequentially in two directions and heat setting the film, said primer coating composition being applied to said film as an aqueous solution prior to stretching the film in one direction, or subsequent to stretching in one direction but prior to stretching in a mutually perpendicular direction, or subsequent to stretching in two directions.

7. The film of claim 6 wherein said film is subjected to a corona discharge treatment prior to the application of said primer coating composition.

8. The film of claim 6 wherein said primer coating composition is applied subsequent to stretching in one direction but prior to stretching in a mutually perpendicular direction.

9. The film of claim 6 wherein said amino silane compound is N-2-(aminoethyl)-3-aminopropyltrimethoxysilane.

10. The film of claim 6 wherein said primer coating composition is present at a weight within the range of about $0.10 \times 10^{-6}$ to about $20 \times 10^{-6}$ lbs. per square foot of film surface on a dry weight basis.

11. The polyester film of claim 4 having a film of a different polymer adhered to the primer coated surface of said polyester film.

12. The film of claim 11 wherein said aminosilane compound is N-2-(aminoethyl)-3-aminopropyltrimethoxy silane.

13. The film of claim 12 wherein said polymer is polyvinylbutyral.

14. The film of claim 13 wherein said primer coating composition is present at a weight within the range of about $0.10 \times 10^{-6}$ to about $20 \times 10^{-6}$ lbs. per square foot of film surface on a dry weight basis.

* * * * *